(12) United States Patent
Li

(10) Patent No.: US 11,069,037 B2
(45) Date of Patent: Jul. 20, 2021

(54) IMAGE FUSION METHOD AND DEVICE FOR REMOVING GHOST ARTIFACTS

(71) Applicant: Shanghai Zhaoxin Semiconductor Co., Ltd., Shanghai (CN)

(72) Inventor: Yichen Li, Beijing (CN)

(73) Assignee: GLENFLY TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/825,144

(22) Filed: Mar. 20, 2020

(65) Prior Publication Data

US 2021/0035269 A1 Feb. 4, 2021

(30) Foreign Application Priority Data

Aug. 2, 2019 (CN) .......................... 201910710765.7

(51) Int. Cl.
*G06T 5/00* (2006.01)
*G06T 5/50* (2006.01)

(52) U.S. Cl.
CPC .............. *G06T 5/002* (2013.01); *G06T 5/009* (2013.01); *G06T 5/50* (2013.01); *G06T 2207/20208* (2013.01); *G06T 2207/20221* (2013.01)

(58) Field of Classification Search
CPC ........... G06T 5/002; G06T 5/009; G06T 5/50; G06T 2207/20208; G06T 2207/20221; G06T 5/003; G06T 2207/20201
See application file for complete search history.

(56) References Cited

U.S. PATENT DOCUMENTS

| | | | |
|---|---|---|---|
| 8,989,484 B2* | 3/2015 | Moon | G06T 5/50 382/162 |
| 9,338,349 B2* | 5/2016 | Sharma | G06T 5/50 |
| 2020/0244862 A1* | 7/2020 | Wang | H04N 5/2353 |

* cited by examiner

*Primary Examiner* — Phuoc Tran
(74) *Attorney, Agent, or Firm* — McClure, Qualey & Rodack, LLP

(57) ABSTRACT

An image fusion method for removing ghost artifacts is provided. The method includes: determining a first fusion weight of a reference pixel in a reference frame, wherein the coordinates of the reference pixel are the same as the coordinates of one of input pixels included in an input frame; determining a reference brightness parameter according to values of all channels of the reference pixel; determining an input brightness parameter according to values of all channels of the input pixel; determining a ghost weight according to an amount that the brightness parameter ratio of the input brightness parameter and the reference brightness parameter deviates from a reasonable range; determining a fusion weight according to the first fusion weight and the ghost weight; and fusing the reference pixel with the input pixel according to the fusion weight to generate a fused pixel in a fused frame.

20 Claims, 6 Drawing Sheets

# IMAGE FUSION METHOD AND DEVICE FOR REMOVING GHOST ARTIFACTS

CROSS REFERENCE TO RELATED APPLICATIONS

This application claims priority from Chinese Patent Application No. 201910710765.7, filed on Aug. 2, 2019 in the China Intellectual Property Office, the content of which is incorporated by reference herein.

BACKGROUND

Technical Field

The present disclosure generally relates to image fusion methods and devices. More specifically, aspects of the present disclosure relate to an image fusion method and a device for removing ghost artifacts.

Description of the Related Art

HDR (High Dynamic Range) images can show a greater range of luminance levels captured in real-world scenes, from direct sunlight to a faint nebula. It is often achieved by capturing and then combining different image frames of the same subject matter having different exposures. Non-HDR cameras take photographs with a limited exposure range, resulting in the loss of detail in saturate or dark areas. HDRM (High Dynamic Range Merging) compensates for this loss of detail by capturing multiple image frames at different exposure levels and combining them to produce an image frame representing a broader tonal range.

However, during HDR image creation, ghosting artifacts can appear in the fused image frame when objects have moved, appeared or disappeared in the different image frames. As a result, an image fusion method and device are provided in the present disclosure to remove ghost artifacts.

SUMMARY

The following summary is illustrative only and is not intended to be limitation in any way. That is, the following summary is provided to introduce concepts, highlights, benefits and advantages of the novel and non-obvious techniques described herein. Thus, the following summary is not intended to identify essential features of the claimed subject matter, nor is it intended to use in determining the scope of the claimed subject matter.

Therefore, the main purpose of the present disclosure is to provide an image fusion method for removing ghost artifacts to solve the above problems. Selected, not all of embodiments will be described in further detail below.

In an embodiment, an image fusion method for removing ghost artifacts is provided in the disclosure. The method is used to perform a fusion operation on a reference frame and an input frame to generate a fused frame, the method comprises: determining a first fusion weight of a reference pixel in the reference frame, wherein the coordinates of the reference pixel are the same as the coordinates of one of a plurality of input pixels included in the input frame; determining a reference brightness parameter according to values of all channels of the reference pixel; determining an input brightness parameter according to values of all channels of the input pixel; determining a ghost weight according to an amount that the brightness parameter ratio of the input brightness parameter and the reference brightness parameter deviates from a reasonable range; determining a fusion weight according to the first fusion weight and the ghost weight; and fusing the reference pixel with the input pixel according to the fusion weight to generate a fused pixel located at corresponding coordinates in the fused frame.

In some embodiments, the greater the amount that the brightness parameter ratio deviates from the reasonable range is, the greater is the ghost weight.

In some embodiments, the ghost weight is calculated using the following formula:

$$w_g = \begin{cases} \dfrac{\left| \dfrac{Y_{P_{in}}}{Y_{P_{ref}}} - \dfrac{EV_{in}}{EV_{ref}} \right|}{r_{tol} \cdot \dfrac{EV_{in}}{EV_{ref}}}, & \dfrac{Y_{P_{in}}}{Y_{P_{ref}}} \in \left[ (1 - r_{tol}) \cdot \dfrac{EV_{in}}{EV_{ref}}, (1 + r_{tol}) \cdot \dfrac{EV_{in}}{EV_{ref}} \right] \\ 1, & \text{other} \end{cases}$$

wherein $w_g$ is the ghost weight, $Y_{P_{in}}$ is the input brightness parameter, $Y_{P_{ref}}$ is the reference brightness parameter, $EV_{in}$ is an input exposure parameter of the input frame, $EV_{ref}$ is a reference exposure parameter of the reference frame, and $r_{tol}$ is a tolerance factor that is greater than 0.

In some embodiments, the ghost weight is calculated using the following formula:

$$w_g = \begin{cases} \dfrac{1 + \cos\left(2\pi \cdot \dfrac{\dfrac{Y_{P_{in}}}{Y_{P_{ref}}} - (1 - r_{tol}) \cdot \dfrac{EV_{in}}{EV_{ref}}}{2 r_{tol} \cdot \dfrac{EV_{in}}{EV_{ref}}} \right)}{2}, & \dfrac{Y_{P_{in}}}{Y_{P_{ref}}} \in \left[ \dfrac{(1 - r_{tol}) \cdot EV_{in}}{EV_{ref}}, \dfrac{(1 + r_{tol}) \cdot EV_{in}}{EV_{ref}} \right] \\ 1, & \text{other} \end{cases}$$

wherein $w_g$ is the ghost weight, $Y_{P_{in}}$ is the input brightness parameter, $Y_{P_{ref}}$ is the reference brightness parameter, $EV_{in}$ is an input exposure parameter of the input frame, $EV_{ref}$ is a reference exposure parameter of the reference frame, and $r_{tol}$ is a tolerance factor that is greater than 0.

In some embodiments, the greater the ghost weight is, the greater is the fusion weight; the smaller the ghost weight is, the closer the fusion weight is to the first fusion weight.

In some embodiments, the fusion weight is calculated using the following formula:

$$w'_f = w_g \cdot (1 - w_f) + w_f$$

wherein $w_g$ is the ghost weight, $w_f$ is the first fusion weight, and $w'_f$ is the fusion weight.

In some embodiments, the step of determining a fusion weight according to the first fusion weight and the ghost weight comprises: determining a second fusion weight according to the first fusion weight and the ghost weight; determining whether the second fusion weight has a high contrast compared to fusion weights of a plurality of neighboring pixels of the reference pixel; performing a post-filtering process on the second fusion weight to generate the fusion weight when the second fusion weight has the high contrast compared to the fusion weights of the plurality of neighboring pixels; and directly assigning the value of the second fusion weight to the fusion weight when the second fusion weight does not have the high contrast compared to the fusion weights of the plurality of neighboring pixels.

In some embodiments, the step of determining whether the second fusion weight has a high contrast compared to fusion weights of a plurality of neighboring pixels of the reference pixel comprises: determining a plurality of contrast flags according to the second fusion weight and the fusion weights of the plurality of neighboring pixels; and determining whether the second fusion weight has the high contrast compared to fusion weights of the neighboring pixels of the reference pixel according to the plurality of contrast flags.

In some embodiments, each of the plurality of contrast flags is calculated using the following formula:

$$f_c = \begin{cases} 1, & w'_{f2} < \frac{1}{k_c} \cdot w'_f \\ -1, & w'_{f2} > \frac{1}{k_c} \cdot w'_f \\ 0, & \text{other} \end{cases}$$

wherein $f_c$ is the contrast flag, $w'_{f2}$ is the second fusion weight, $w'_f$ is one of the fusion weights of the neighboring pixels, and $k_c$ is the contrast factor, wherein $k_c$, is greater than 1.

In some embodiments, when the absolute value of the sum of the plurality of contrast flags is greater than or equal to a threshold, it is determined that the second fusion weight has the high contrast compared to the fusion weights of the plurality of neighboring pixels.

In some embodiments, the post-filtering process comprises: executing a convolution operation on a window including the second fusion weight and the fusion weights of the plurality of neighboring pixels using a predefined convolution kernel.

In some embodiments, the reference brightness parameter is calculated using the following formula:

$$Y_{P_{ref}} = \sum_{C_{P_{ref}} \in S_{P_{ref}}} C_{P_{ref}}/|S_{P_{ref}}|$$

wherein $Y_{P_{ref}}$ is the reference brightness parameter, $C_{P_{ref}}$ is a set of values of all channels of the reference pixel, and $|S_{P_{ref}}|$ is the number of channels in which the values of all channels of the reference pixel are within a range; wherein the input brightness parameter is calculated using the following formula:

$$Y_{P_{in}} = \sum_{C_{P_{in}} \in S_{P_{in}}} C_{P_{in}}/|S_{P_{in}}|$$

wherein $Y_{P_{in}}$ is the input brightness parameter, $C_{P_{in}}$ is a set of values of all channels of the input pixel, $|S_{P_{in}}|$ is the number of channels in which the values of all channels of the input pixel are within a range.

In some embodiments, when $|S_{P_{ref}}|$ is 0, the final value of the fusion weight is set to the first fusion weight, and when $|S_{P_{ref}}|$ is not 0 and $|S_{P_{in}}|$ is 0, the final value of the fusion weight is set to 1.

In some embodiments, the fused pixel is generated using the following formula:

$$C_p = w'_f C_{P_{ref}} + (1-w'_f) \cdot C_{P_{in}}$$

wherein $C_p$ is a set of values of all channels of the fused pixel, $C_{P_{ref}}$ is a set of values of all channels of the reference pixel, $C_{P_{in}}$ is a set of values of all channels of the input pixel, and $w'_f$ is the fusion weight.

In some embodiments, the step of determining a first fusion weight of a reference pixel in the reference frame comprises: determining a reference pixel weight according to a brightness value of the reference pixel; determining an input pixel weight according to a brightness value of the input pixel; and determining the first fusion weight according to the reference pixel weight and the input pixel weight.

In some embodiments, the first fusion weight is calculated using the following formula:

$$w_f = w_{ref}/(w_{ref} + w_{in})$$

wherein $w_f$ is the first fusion weight, $w_{ref}$ is the reference pixel weight, and $w_{in}$ is the input pixel weight.

In some embodiments, the method further comprises: receiving the first frame and setting the first frame as the reference frame; receiving a second frame and setting the second frame as the input frame; performing the fusion operation on the first frame and the second frame to generate a first fused frame; setting the first fused frame as the reference frame; receiving a third frame and setting the third frame as the input frame; and performing the fusion operation on the first fused frame and the third frame to generate a second fused frame.

In some embodiments, the first frame is a normal exposure frame, the second frame is a low exposure frame, the third frame is a high exposure frame, and the second fused frame is a high dynamic range image.

In an exemplary embodiment, an image fusion device for removing ghost artifacts is provided in the disclosure. The device is used to perform a fusion operation on a reference frame and an input frame to generate a fused frame, and the device comprises: a frame buffer, temporarily storing the reference frame; a graphics processing unit, coupled to the frame buffer, wherein the image processor determines a first fusion weight of a reference pixel in the reference frame, wherein the coordinates of the reference pixel are the same as the coordinates of one of a plurality of input pixels included in the input frame; determines a reference brightness parameter according to values of all channels of the reference pixel; determines an input brightness parameter according to values of all channels of the input pixel; determines a ghost weight according to an amount that the brightness parameter ratio of the input brightness parameter and the reference brightness parameter deviates from a reasonable range; determines a fusion weight according to the first fusion weight and the ghost weight; and fuses the reference pixel with the input pixel according to the fusion weight to generate a fused pixel located at corresponding coordinates in the fused frame.

The image fusion method and the image fusion device for removing ghost artifacts in present disclosure comprises: determining the ghost weight according to the amount that the brightness parameter ratio of the input brightness parameter and the reference brightness parameter deviates from the reasonable range, and correcting the fusion weight of the reference pixel by using the determined ghost weight to achieve the better effect of removing the ghost artifacts when fusing the images.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, the same numerals refer to the same elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
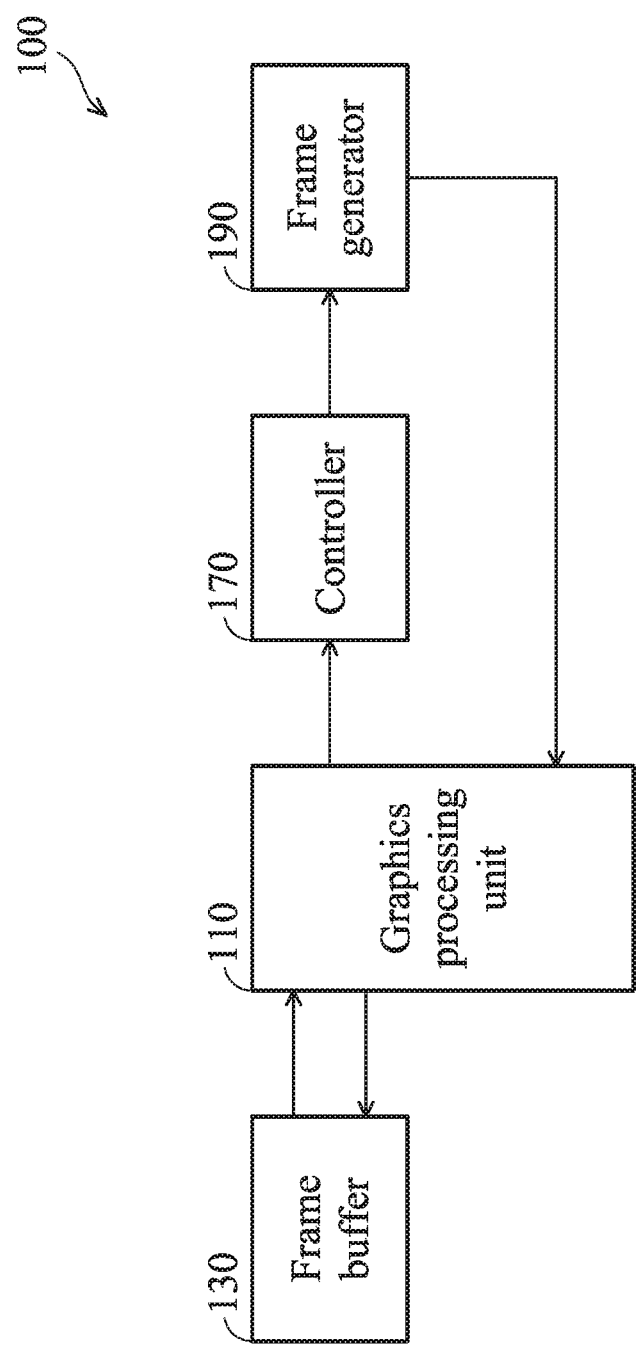
FIG. 1 is a schematic diagram illustrating the system architecture of an image fusion device for removing ghost artifacts according to an embodiment of the disclosure.

FIG. 1 is a schematic diagram illustrating the system architecture of an image fusion device 100 for removing ghost artifacts according to an embodiment of the disclosure. The architecture may be implemented on a desktop computer, a notebook computer, a tablet PC (personal computer), a mobile phone, a digital camera, a digital recorder, or another device which contains at least a graphics processing unit 110. The graphics processing unit 110 can be implemented in numerous ways, such as with dedicated hardware circuits, or with general-purpose hardware (e.g., a single processor, multiple processors or graphics processing units capable of parallel computations, or others) that is programmed using microcode or software instructions to perform the functions recited herein.

The graphics processing unit 110 is used to perform the image fusion method of the present disclosure and fuses a reference frame and an input frame to generate a fused frame without ghost artifacts. The graphics processing unit 110 may control a frame generator 190 to generate image frames (e.g., the first frame, the second frame, and the third frame, etc.) through a controller 170, set the generated image frames as a reference frames and an input frame (e.g., setting the first frame as a reference frame and setting the second frame as an input frame), and fuse the reference frame and the input frame to generate a fused frame. The graphics processing unit 110 may also set the fused frame generated after fusing the reference frame and the input frame as the reference frame, set the image frame (for example, the third frame) generated by the frame generator 190 as the input frame and perform the fusion process again.

The fusion process performed by the graphics processing unit 110 is performed on the basis of the reference frame, that is, the fusion process needs to generate a fusion weight of the reference frame. Specifically, the graphics processing unit 110 fuses the pixel values of the input frame with the pixel values of the corresponding coordinates in the reference frame according to the generated fusion weight to generate the pixel values of the corresponding coordinates in the fused frame, thereby correcting the pixel values in the underexposed or overexposed area of the reference frame by using the pixel values in the input frame, so that the underexposed or overexposed area in the reference frame is modified to an area where the exposure is normal in the fused frame.

The frame generator 190 may comprise an image sensor, such as a complementary metal-oxide-semiconductor (CMOS) or charge-coupled device (CCD) sensor, to detect an image in the form of the intensity of red, green and blue light. The frame generator 190 may also include readout electronic circuits for reading the sensed data from the image sensor. The frame buffer 130 is used to store the reference frame. When the images are fused, the graphics processing unit 110 stores the reference frame to the frame buffer 130 and reads the pixels of the input frame directly from the frame generator 190 to perform the fusion process. In another embodiment, the graphics processing unit 110 stores both the reference frame and the input frame to the frame buffer 130 and then performs the fusion process.

It should be noted that the image fusion method of the present disclosure can be applied in a process for generating a high dynamic range (HDR) image to remove ghost artifacts. In this embodiment, the graphics processing unit 110 may obtain at least three low dynamic range (LDR) frames from the frame generator 190. In an embodiment, these three LDR frames are 12-bit frames, and one of the LDR frames is obtained under an optimal exposure setting, which is calculated using an automatic exposure (AE) algorithm, hereinafter referred to as the first frame. It should be noted that the exposure settings used when the first frame is obtained comprises a shutter speed, an analog gain, and a digital gain, wherein these setting parameters are also recorded in the frame buffer 130 or in a memory (not shown in FIG. 1). The other LDR frame is a low exposure frame, hereinafter referred to as the second frame. Another LDR frame is a high exposure frame, hereinafter referred to as the third frame. The graphics processing unit 110 performs the fusion process on the first frame and the second frame by using the image fusion method for removing ghost artifacts proposed in the present disclosure, that is, the graphics processing unit 110 performs the fusion process by setting the first frame as the reference frame and setting the second frame as the input frame to generate an intermediate fused frame. Then, the graphics processing unit 110 performs the same fusion process on the generated intermediate fused frame and the third frame, that is, the graphics processing unit 110 performs the same fusion process by setting the intermediate fused frame as the reference frame and setting the third frame as the input frame to generate a high dynamic range (HDR) frame. In an embodiment, the output HDR frame is an 18-bit frame. The process for generating the high dynamic range image by using the image fusion method of the present disclosure can be referred to the detailed description of the embodiment of FIG. 6.

The image fusion device 100 typically includes a variety of computer-readable media (not shown in FIG. 1). The computer-readable media can be any available media that can be accessed by the image fusion device 100 and includes both volatile and nonvolatile media, removable and non-removable media. By way of example, but not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EE-PROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the image fusion device 100. The computer storage media may not comprise signal per se.

Figure 2:
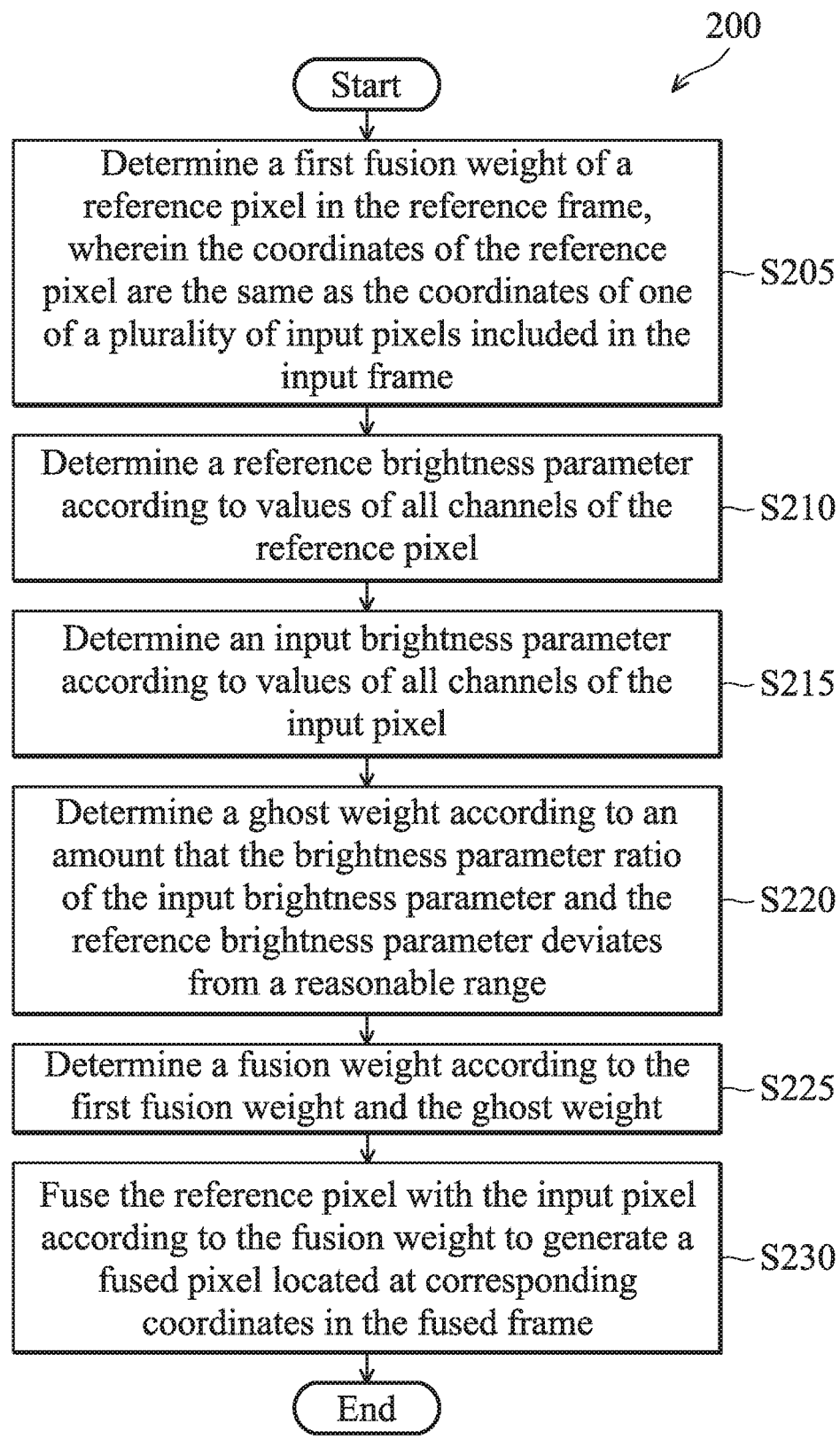
FIG. 2 is a flow chart illustrating an image fusion method for removing ghost artifacts according to an embodiment of the present disclosure.

FIG. 2 is a flow chart illustrating an image fusion method 200 for removing ghost artifacts according to an embodiment of the present disclosure. The graphics processing unit 110 needs to fuse each reference pixel in the reference frame with each input pixel corresponding to the same coordinates in the input frame to generate each fused pixel corresponding to the same coordinates in the fused frame. For example, the graphics processing unit 110 performs the fusion process on a reference pixel located at the coordinates (x, y) in the reference frame with an input pixel located at the coordinates (x, y) in the input frame to generate a fused pixel located at the coordinates (x, y) in the fused frame. The image fusion method 200 shown in FIG. 2 is a processing flowchart, which illustrates how a reference pixel $1_{ref}$ in the reference frame is fused with an input pixel $p_{in}$ in the input frame, wherein the coordinates of the reference pixel $p_{ref}$ in the reference frame are the same as the coordinates of the input pixel $p_{in}$ in the input frame. The fusion process is performed on all the reference pixels in the reference frame with the input pixels corresponding to the same coordinates in the input frame by using the image fusion method 200 shown in FIG. 2 to generate all the fused pixels in the fused frame. The image fusion method 200 shown in FIG. 2 will be described in more detail below by taking the reference pixel $p_{ref}$, which has the coordinates (x, y) in the reference frame, and the input pixel $p_{in}$, which has the same coordinates (x, y) in the input frame as an example.

The image fusion method shown in FIG. 2 comprises: determining a first fusion weight of a reference pixel in the reference frame, wherein the coordinates of the reference pixel are the same as the coordinates of one of a plurality of input pixels included in the input frame (step S205); determining a reference brightness parameter according to values of all channels of the reference pixel (step S210); determining an input brightness parameter according to values of all channels of the input pixel (step S215); determining a ghost weight according to an amount that the brightness parameter ratio of the input brightness parameter and the reference brightness parameter deviates from a reasonable range (step S220); determining a fusion weight according to the first fusion weight and the ghost weight (step S225); and fusing the reference pixel with the input pixel according to the fusion weight to generate a fused pixel located at corresponding coordinates in the fused frame (step S230).

In step S205, the graphics processing unit 110 determines the first fusion weight of the reference pixel $p_{ref}$ located in the reference frame, wherein the coordinates of the reference pixel $p_{ref}$ are the same as the coordinates of one of the input pixels $p_{in}$ included in the input frame. Details on how to obtain the first fusion weight in step S205 will be described later in FIG. 3.

In step S210, the graphics processing unit 110 determines a reference brightness parameter according to values of all channels of the reference pixel $p_{ref}$. Next, in step S215, the graphics processing unit 110 determines an input brightness parameter according to values of all channels of the input pixel $p_{in}$. In step S220, the graphics processing unit 110 determines a ghost weight according to an amount that the brightness parameter ratio of the input brightness parameter and the reference brightness parameter deviates from a reasonable range, wherein the greater the amount that the brightness parameter ratio deviates from the reasonable range is, the greater is the ghost weight.

Specifically, the reference brightness parameter and the input brightness parameter must be obtained before the ghost weight is calculated. In step S210, the graphics processing unit 110 determines the reference brightness parameter according to the values of all channels of the reference pixel $p_{ref}$, and the reference brightness parameter is calculated using the following formula:

$$Y_{P_{ref}} = \Sigma c_{P_{ref}} \in s_{P_{ref}} C_{P_{ref}} / |S_{P_{ref}}| \qquad (1)$$

wherein $Y_{P_{ref}}$ is the reference brightness parameter, $C_{P_{ref}}$ is a set of values of all channels of a reference pixel, $|S_{P_{ref}}|$ is the number of channels in which the values of all channels of the reference pixel are within a range. For example, it is assumed that the range of $S_{P_{ref}}$ is $S_{P_{ref}} = \{x | 150 < x < 4000\}$, and the values of R/G/B channels of a pixel $p_{ref}$ in the input frame are $C_{P_{ref}} = \{190, 1000, 4010\}$. Since the number of the values of R/G/B channels within the range of $S_{P_{ref}}$ is 2 (190 and 1000), thus $|S_{P_{ref}}|$ is equal to 2 and $Y_{P_{ref}} = (190+1000)/2$.

In step S215, the graphics processing unit 110 determines the input brightness parameter according to the values of all channels of the input pixel $p_{in}$, wherein the input brightness parameter is calculated using the following formula:

$$Y_{P_{in}} = \Sigma c_{P_{in}} \in s_{P_{in}} C_{P_{in}} / |S_{P_{in}}| \qquad (2)$$

wherein $Y_{P_{in}}$ is the input brightness parameter, $C_{P_{in}}$ is a set of values of all channels of the input pixel, $|S_{P_{in}}|$ is the number of channels in which the values of all channels of the input pixel are within a range. For example, it is assumed that the range of $S_{p_{in}}$ is $S_{p_{in}} = \{x | 150 < X < 4000\}$, and the values of R/G/B channels of $p_{in}$ in the input frame are $C_{p_{in}} = \{190, 1000, 4010\}$. Since the number of the values of R/G/B channels within the range of $S_{p_{in}}$ is 2 (190 and 1000), thus $|S_{p_{in}}|$ is equal to 2 and $Y_{p_{in}} = (190+1000)/2$.

It should be noted that when $|S_{p_{ref}}|$ is 0, the reference brightness parameter $Y_{p_{ref}}$ cannot be calculated according to the formula (1). When $|S_{p_{in}}|$ is 0, the input brightness parameter $Y_{p_{in}}$ cannot be calculated according to formula (2). As a result, when $|S_{p_{ref}}|$ is 0, the graphics processing unit 110 may set the final value of the fused weight to the first fusion weight. When $|S_{p_{ref}}|$ is not 0 and $|S_{p_{in}}|$ is 0, the graphics processing unit 110 may set the final value of the fusion weight to 1.

In step S220, the graphics processing unit 110 determines the ghost weight according to the amount that the brightness parameter ratio $$\frac{Y_{p_{in}}}{Y_{p_{ref}}}$$

of the input brightness parameter $Y_{p_{in}}$ and reference brightness parameter $Y_{p_{ref}}$ deviates from a reasonable range, wherein the greater the amount that the brightness parameter ratio deviates from the reasonable range is, the greater is the ghost weight. Specifically, the graphics processing unit 110 first calculates the brightness parameter ratio $$\frac{Y_{p_{in}}}{Y_{p_{ref}}}.$$

Then, the graphics processing unit 110 obtains an exposure parameter of the reference frame $EV_{ref}$ in linear scale and an exposure parameter of the input frame $EV_{in}$ in linear scale, and calculates an exposure parameter ratio $$\frac{EV_{in}}{EV_{ref}}$$

of the exposure parameter of input frame $EV_{in}$ and the exposure parameter of the reference frame $EV_{ref}$. In an embodiment, the exposure parameter $EV_{ref}$ is related to the exposure settings when the frame generator 190 obtains (or captures) the reference frame, wherein the exposure settings comprises, for example, a shutter speed (sht1), an analog gain (ag1), and a digital gain (dg1). In an embodiment, the exposure parameter $EV_{ref}$ is the product of the shutter speed (sht1), the analog gain (ag1) and the digital gain (dg1), that is, $EV_{ref} = sht1 \times ag1 \times dg1$. The exposure parameter $EV_{in}$ is related to the exposure settings when the frame generator 190 obtains (or captures) the input frame, wherein the exposure settings comprises, for example, a shutter speed (sht2), an analog gain (ag2), and a digital gain (dg2). In an embodiment, the exposure parameter $EV_{in}$ is the product of the shutter speed (sht2), the analog gain (ag2) and the digital gain (dg2), that is, $EV_{in} = sht2 \times ag2 \times dg2$.

In an embodiment, the numerical range around the exposure parameter ratio $$\frac{EV_{in}}{EV_{ref}}$$

(such as the numerical range between $$\frac{EV_{in}}{EV_{ref}} - 0.1 \text{ and } \frac{EV_{in}}{EV_{ref}} + 0.1)$$

is the reasonable range of the brightness parameter ratio $$\frac{Y_{p_{in}}}{Y_{p_{ref}}}.$$

The input pixel $p_{in}$ and the reference pixel $p_{ref}$ are generated by the frame generator 190 with different exposure parameters in a short period of time according to the brightness in the same position in the same scene. Since the time between the generation of the input pixel $p_{in}$ and the reference pixel $p_{ref}$ is very short, the illumination conditions in the scene remain basically unchanged. When the scenery at the position in the corresponding scene of the input pixel $p_{in}$ and the reference pixel $p_{ref}$ remains unchanged, the brightness at the position in the corresponding scene of the input pixel $p_{in}$ and the reference pixel $p_{ref}$ remains unchanged. Thus, the brightness parameter ratio $$\frac{Y_{p_{in}}}{Y_{p_{ref}}}$$

is very close to the exposure parameter ratio $$\frac{EV_{in}}{EV_{ref}}.$$

In this case, even though the pixel value of the input pixel $p_{in}$ of the input frame is directly used to replace the pixel value of the reference pixel $p_{ref}$ of the reference frame (i.e., the extreme case of the first fusion weight $w_f = 0$), ghost artifacts do not occur in the generated fused frame. When the scenery at the position in the corresponding scene of the input pixel $p_{in}$ and the reference pixel $p_{ref}$ changes, the brightness at the position in the corresponding scene of the input pixel $p_{in}$ and the reference pixel $p_{ref}$ also changes. Thus, the brightness parameter ratio $$\frac{Y_{p_{in}}}{Y_{p_{ref}}}$$

will be significantly different from the exposure parameter ratio $$\frac{EV_{in}}{EV_{ref}}.$$

In this case, when the pixel value of the input pixel $p_{in}$ of the input frame is directly used to replace the pixel value of the reference pixel $p_{ref}$ of the reference frame (i.e., the extreme case of the first fusion weight $w_f = 0$), ghost artifacts will occur in the generated fused frame. For this reason, the ghost weight is determined by using the amount that the brightness parameter ratio $$\frac{Y_{P_{in}}}{Y_{P_{ref}}}$$

deviates from the reasonable range determined by the exposure parameter ratio $$\frac{EV_{in}}{EV_{ref}}$$

in one of the embodiments of the present disclosure.

Next, the graphics processing unit 110 determines the ghost weight according to the amount that the brightness parameter ratio $$\frac{Y_{P_{in}}}{Y_{P_{ref}}}$$

deviates from the reasonable range determined by the exposure parameter ratio $$\frac{EV_{in}}{EV_{ref}}.$$

In one embodiment, the ghost weight is calculated with a linear function as follows:

$$w_g = \begin{cases} \frac{\left|\frac{Y_{P_{in}}}{Y_{P_{ref}}} - \frac{EV_{in}}{EV_{ref}}\right|}{r_{tol} \cdot \frac{EV_{in}}{EV_{ref}}}, & \frac{Y_{P_{in}}}{Y_{P_{ref}}} \in \left[(1-r_{tol}) \cdot \frac{EV_{in}}{EV_{ref}}, (1+r_{tol}) \cdot \frac{EV_{in}}{EV_{ref}}\right] \\ 1, & \text{other} \end{cases} \quad (3)$$

wherein $w_g$ is the ghost weight, $Y_{p_{in}}$ is the input brightness parameter, $Y_{P_{ref}}$ is the reference brightness parameter, $EV_{in}$ is the input exposure parameter of the input frame, $EV_{ref}$ is the reference exposure parameter of the reference frame, and $r_{tol}$ is a tolerance factor that is greater than 0. $r_{tol}$ is used to set the strength of removing ghost artifacts. In other words, as the tolerance factor $r_{tol}$ becomes smaller, the tolerance of ghost artifacts becomes less. Therefore, the ghost artifacts are easier to be removed. For example, it is assumed that $EV_{in}/EV_{ref}=2$ and $r_{tol}=0.5$. When $Y_{P_{in}}/Y_{P_{ref}}=2$, the strength of ghost the weight $w_g$ has a minimum value 0. When $Y_{P_{in}}/Y_{P_{ref}}=1.8$, the strength of the ghost weight $w_9$ is 0.2. When $Y_{P_{in}}/Y_{P_{ref}}=0.7$ or $Y_{P_{in}}/Y_{P_{ref}}=123.4$, the strength of the ghost weight $w_g$ has a maximum value of 1.

In another embodiment, the ghost weight is calculated with a non-linear function as follows:

$$w_g = \begin{cases} \frac{1+\cos\left(2\pi \cdot \frac{\frac{Y_{P_{in}}}{Y_{P_{ref}}} - (1-r_{tol}) \cdot \frac{EV_{in}}{EV_{ref}}}{2r_{tol} \cdot \frac{EV_{in}}{EV_{ref}}}\right)}{2}, & \frac{Y_{P_{in}}}{Y_{P_{ref}}} \in \left[\frac{(1-r_{tol}) \cdot EV_{in}}{EV_{ref}}, \frac{(1+r_{tol}) \cdot EV_{in}}{EV_{ref}}\right] \\ 1, & \text{other} \end{cases} \quad (4)$$

wherein $w_g$ is the ghost weight, $Y_{P_{in}}$ is the input brightness parameter, $Y_{P_{ref}}$ is the reference brightness parameter, $EV_{in}$ is the input exposure parameter of the input frame, $EV_{ref}$ is the reference exposure parameter of the reference frame, and $r_{tol}$ is a tolerance factor that is greater than 0. $r_{tol}$ is used to set the strength of removing the ghost artifacts. In other words, when the tolerance factor $r_{tol}$ becomes smaller, the tolerance of ghost artifacts becomes less. Therefore, the ghost artifacts are easier to be removed. For example, it is assumed that $EV_{in}/EV_{ref}=2$ and $r_{tol}=0.5$. When $Y_{P_{in}}/Y_{P_{ref}}=2$, the strength of the ghost weight $w_g$ has a minimum value of 0. When $Y_{P_{in}}/Y_{P_{ref}}=1.5$, the strength of the ghost weight $w_9$ is 0.5. When $Y_{P_{in}}/Y_{P_{ref}}=0.7$ or $Y_{P_{in}}/Y_{P_{ref}}=123.4$, the strength of the ghost weight $w_g$ has a maximum value of 1.

In some embodiments, the ghost weight $w_g$ can also be calculated with other linear or non-linear functions, and it is not limited to the embodiments shown in equation (3) and equation (4).

Then, in step S225, the graphics processing unit 110 determines the fusion weight according to the first fusion weight and the ghost weight. The greater the ghost weight is, the greater is the fusion weight; and the smaller the ghost weight is, the closer the fusion weight is to the first fusion weight. The details of how to determine the fusion weight according to the first fusion weight and the ghost weight will be described in detail later, in FIG. 4.

In step S230, the graphics processing unit 110 fuses the reference pixel and the input pixel according to the fusion weight to generate a fused pixel located at corresponding coordinates in the fused frame, wherein the fused pixel is generated with the following formula:

$$C_p = w'_f \cdot C_{P_{ref}} + (1-w'_f) \cdot C_{P_{in}} \quad (5)$$

wherein $C_p$ is a set of values of all channels of the fused pixel, $C_{P_{ref}}$ is a set of values of all channels of the reference pixel, $C_{P_{in}}$ is a set of values of all channels of the input pixel and $w'_f$ is the fusion weight.

Figure 3:
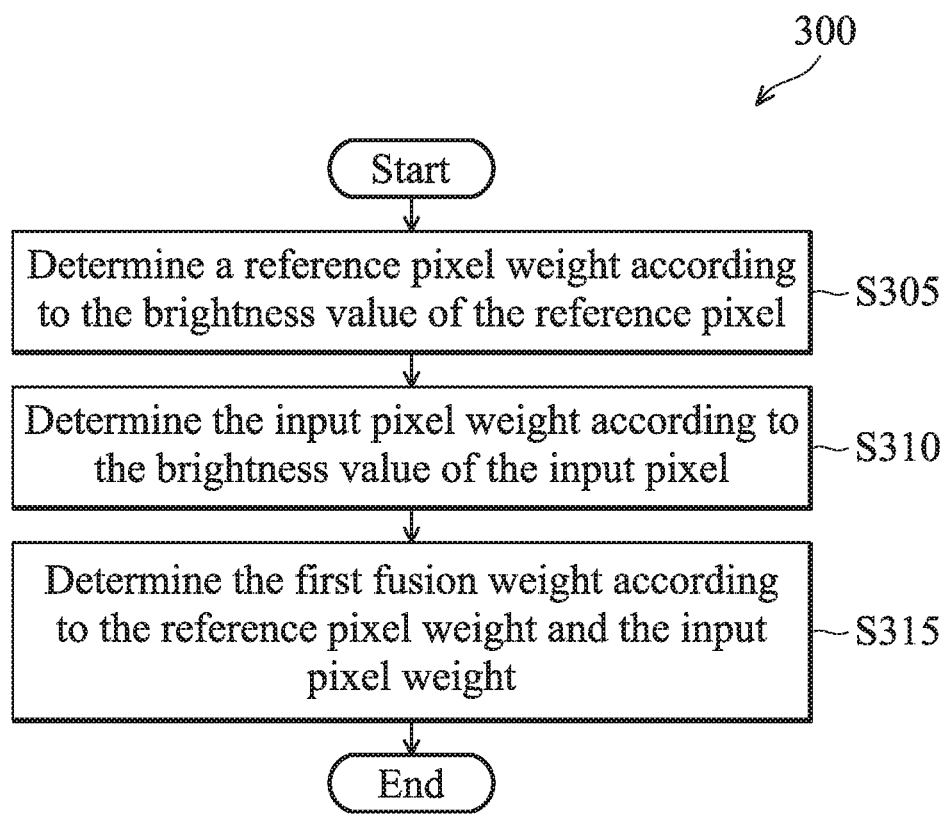
FIG. 3 is a flow chart illustrating how to determine a first fusion weight according to an embodiment of the present disclosure.

FIG. 3 is a flow chart 300 illustrating how to determine a first fusion weight according to an embodiment of the present disclosure. In step S305, the graphics processing unit 110 determines a reference pixel weight according to the brightness value of the reference pixel. In this step, the brightness value Y of the reference pixel $p_{ref}$ located at coordinates (x, y) in the reference frame can be expressed by the following formula:

$$Y = \frac{w_R \cdot R + w_G \cdot G + w_B \cdot B}{w_R + w_G + w_B} \quad (6)$$

wherein the R, G and B are the values of color channels corresponding to the color channels red, green and blue, respectively, and $w_R$, $w_G$ and $w_B$ are the weights corresponding to the color channels, respectively.

In an embodiment, the pixel weight of the reference pixel $p_{ref}$ located at coordinates (x, y) in the reference frame can be calculated with a linear function as follows:

$$w_{ref} = \begin{cases} 1 - \frac{|Y - 2^{b-1}|}{2^{b-1} - a}, & Y \in [a, 2^b - a] \\ 0, & Y \in [0, a) \cup (2^b - a, 2^b) \end{cases} \quad (7)$$

wherein Y is the brightness value of reference pixel $p_{ref}$ located at coordinates (x, y) in the reference frame (that is, Y in the equation (6)), a is a low default threshold and b is a bit precision of a frame.

As another example, the pixel weight $w_{ref}$ of the reference pixel $p_{ref}$ located at coordinates (x, y) in the reference frame may be represented with a linear function expressed as follows:

$$w_{ref} = \begin{cases} 1 - \frac{|Y - a|}{b}, & Y \in [a - b, a + b] \\ 0, & \text{other} \end{cases} \quad (8)$$

wherein Y is a brightness value of the reference pixel $p_{ref}$ located at the coordinates (x, y) in the reference frame (that is, Y in the equation (6)), a is a parameter between 0 and 1, b is a parameter between 0 and 0.5, and $0 \le a-b < a+b \le 1$. For example, it is assumed that a is 0.5 and b is 0.4. When the brightness value Y of the reference pixel $p_{ref}$ located at coordinates (x, y) in the reference frame is 0.5, the pixel weight $w_{ref}$ has a maximum value of 1. When the brightness value Y of the pixel located at coordinates (x, y) in the reference frame is 0.4, the pixel weight $w_{ref}$ is 0.75. When the brightness value Y of the pixel located at coordinates (x, y) in the reference frame is 0.05 or 0.98, the pixel weight $w_{ref}$ is 0.

In another embodiment, the pixel weight $w_{ref}$ of the reference pixel $p_{ref}$ located at coordinates (x, y) in the reference frame can be expressed with a non-linear function as follows:

$$w_{ref} = f(Y) \quad (9)$$

wherein Y is the brightness value of the reference pixel $p_{ref}$ located at coordinates (x, y) in the reference frame (that is, Y in the equation (6)). When Y=a such that f(a)=1, $w_{ref}$ is the maximum fusion weight, wherein a is a parameter between 0 and 1. When Y deviates from a (Y is greater or smaller than a), f(Y) becomes smaller. When $Y \in [0,m] \cup [n,1]$ and $0 \le m < a < n \le 1$, f(Y)=0.

In some embodiments, the reference pixel weight $w_{ref}$ may also be calculated with other linear or non-linear functions, and is not limited to the embodiments shown in equations (7), (8), and (9).

In step S310, the graphics processing unit 110 determines the input pixel weight $w_{in}$ according to the brightness value of the input pixel. The process of determining the input pixel weight $w_{in}$ is the same as the process of determining the reference pixel weight $w_{ref}$ in step S305. What is needed to do is to replace the brightness value of the reference pixel with the brightness value of the input pixel, so the details related to the step will be omitted.

In step S315, the graphics processing unit 110 determines the first fusion weight $w_f$ according to the reference pixel weight $w_{ref}$ and the input pixel weight $w_{in}$. Specifically, the first fusion weight $w_f$ can be calculated with the following formula:

$$w_f = w_{ref}/(w_{ref} + w_{in}) \quad (10)$$

wherein $w_{ref}$ is the reference pixel weight, $w_{in}$ is the corresponding input pixel weight. $w_{ref}$ and $w_{in}$ can be calculated with the equations (7), (8) and (9). It should be noted that when $w_{ref}$ and $w_{in}$ are both 0, the first fusion weight $w_{ref}$ may not be calculated with the equation (10). Taking the equation (7) as example, when the brightness value of the reference frame $Y_{ref}$ and the brightness value of the input frame $Y_{in}$ are both smaller than the low preset threshold a, the first fusion weight $w_f$ is determined with the pixel weight of the frame having a higher brightness parameter. For example, when $w_{ref}$ and $w_{in}$ are both 0, the brightness value of the reference frame $Y_{ref}$ and the brightness value of the input frame $Y_{in}$ are both smaller than the low preset threshold a and the brightness value of the reference frame $Y_{ref}$ is greater than the brightness value of the input frame $Y_{in}$, the first fusion weight $w_f$ is the reference pixel weight $w_{ref}$ of the reference frame (that is, $w_f = w_r$). When $w_{ref}$ and $w_{in}$ are both 0, and the brightness value $Y_{ref}$ of the reference frame and the brightness value $Y_{in}$ of the input frame are both greater than a high preset threshold $2^b - a$, the first fusion weight $w_f$ is determined with the pixel weight of the frame having a lower brightness parameter.

Figure 4:
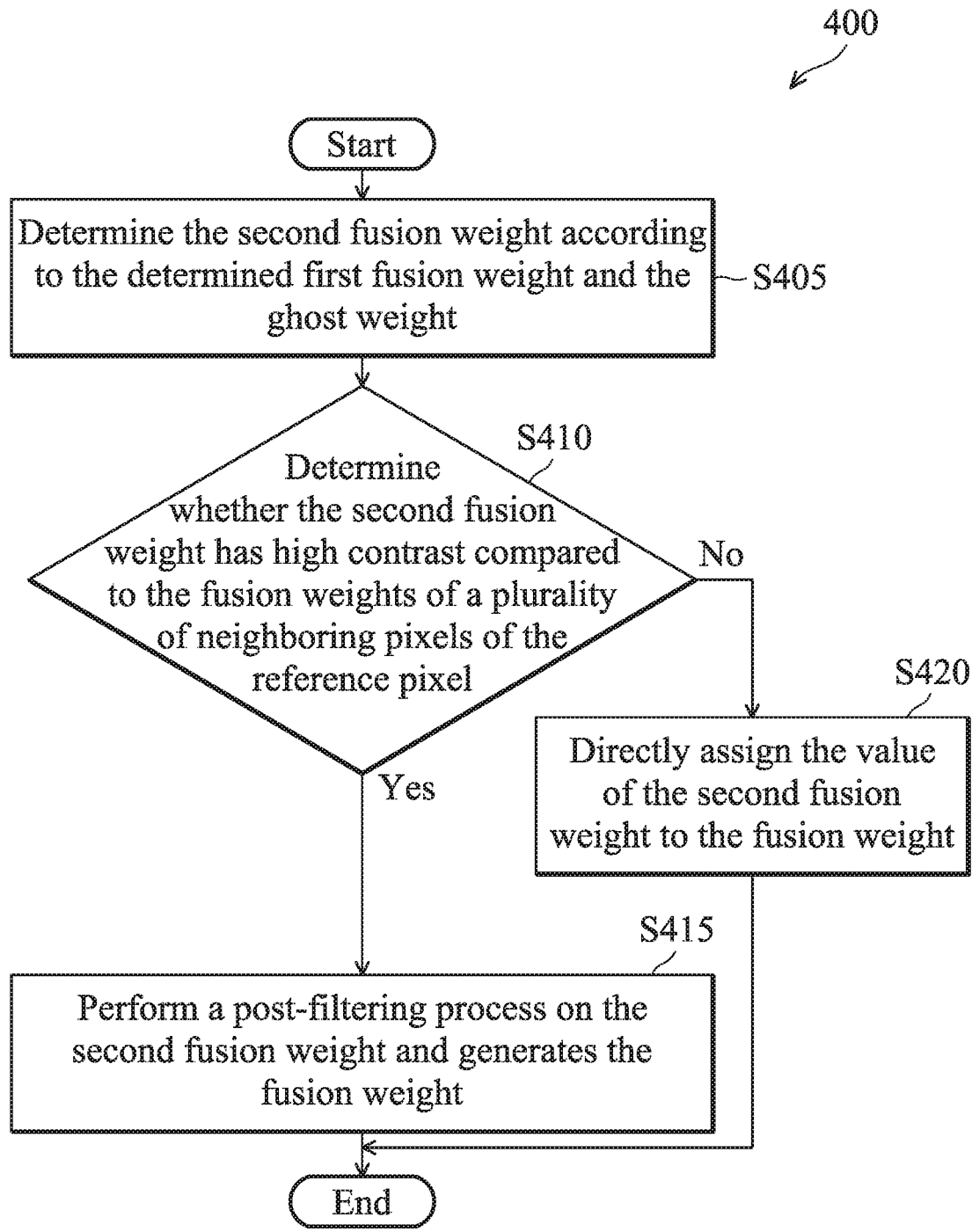
FIG. 4 is a flow chart of illustrating how to determine the fusion weight in accordance with an embodiment of the present disclosure.

FIG. 4 is a flow chart 400 of illustrating how to determine the fusion weight in accordance with an embodiment of the present disclosure. In order to avoid ghosting artifacts in the generated fused frame, in step S405, the graphics processing unit 110 determines the second fusion weight $w_{f2}$ according to the determined first fusion weight $w_f$ and the ghost weight $w_g$. The second fusion weight $w_{f2}$ is calculated with the following formula:

$$w'_{f2} = w_g \cdot (1 - w_f) + w_f \quad (11)$$

wherein $w_g$ is the ghost weight, $w_f$ is the first fusion weight, and $w'_{f2}$ is the second fusion weight.

Next, in step S410, the graphics processing unit 110 determines whether the second fusion weight $w'_{f2}$ has high contrast compared to the fusion weights of a plurality of neighboring pixels of the reference pixel. When the second fusion weight $w'_{f2}$ has high contrast compared to the fusion weights of the plurality of neighboring pixels, the graphics processing unit 110 performs a post-filtering process on the second fusion weight $w'_{f2}$ and then generates the fusion weight $w'_f$ to reduce the contrast (step S415). When the second fusion weight $w'_{f2}$ does not have high contrast compared to the fusion weights of the plurality of neighboring pixels, the graphics processing unit 110 directly assigns the value of the second fusion weight $w'_{f2}$ to the fusion weight $w'_f$ (step S420). Moreover, the graphics processing unit 110 only uses the fusion weights of the neighboring pixels of the previous row (or the previous column) when performing the post-filtering process, thereby achieving better effects of removing the ghost artifacts while reducing computational complexity. In an embodiment, the graphics processing unit 110 is set to remove the ghost artifacts in order from left to right, top to bottom. The graphics processing unit 110 only uses the fusion weights of the neighboring pixels p1, p2 and p3 of the previous row of the reference pixel $p_{ref}$ located at coordinates (x, y) when performing the post-filtering process, wherein the coordinates of neighboring pixels p1, p2 and p3 are (x−1, y−1), (x, y−1), and (x+1, y−1), respectively. In another embodiment, the graphics processing unit 110 is set to remove the ghost artifacts in order from top to bottom, left to right. The graphics processing unit 110 uses only the fusion weights of the neighboring pixels p1, p2 and p3 of the previous column of the reference pixel $p_{ref}$ located at coordinates (x, y) when performing the post-filtering process, wherein the coordinates of neighboring pixels p1, p2 and p3 are (x−1, y−1), (x−1, y), and (x−1, y+1), respectively.

There are two situations in which the second fusion weight w'$_{f2}$ has high contrast compared to the fusion weights of the plurality of neighboring pixels of the reference pixel. One is that, in some cases, the ghost artifacts are not actually present, but the calculated strength of the ghost artifacts is relatively large. The second one is the overexposed or underexposed areas are replaced with ghost areas under normal exposure. For example, the reason for the first situation may be that when the image is generated, the pixel values of the generated pixels are incorrect (the pixel values of the generated pixels are larger or smaller than the actual values) due to the noise of the image capturing device. For the two reasons, it is necessary to perform the post-filtering process on the second fusion weight w'$_{f2}$ to reduce high contrast between the current pixel and the neighboring pixels. The process flow of step S410 is described below.

First, the graphics processing unit 110 determines contrast flags according to the second fusion weight w'$_{f2}$ and the fusion weights of the neighboring pixels. The graphics processing unit 110 calculates each of the contrast flags using the following formula:

$$f_c = \begin{cases} 1, & w'_{f2} < \frac{1}{k_c} \cdot w'_f \\ -1, & w'_{f2} > k_c \cdot w'_f \\ 0, & \text{other} \end{cases} \quad (12)$$

wherein $f_c$ is the contrast flag, w'$_{f2}$ is the second fusion weight, w'$_f$ is one of the fusion weights of the neighboring pixels, and $k_c$ is the contrast factor, wherein $k_c$, is greater than 1.

Then, the graphics processing unit 110 determines whether the second fusion weight w'$_{f2}$ has high contrast compared to the fusion weights w'$_f$ of the plurality of neighboring pixels according to the contrast flags, wherein the graphics processing unit 110 determines that the second fusion weight w'$_{f2}$ has high contrast compared to the fusion weights w'$_f$ of the plurality of neighboring pixels when the absolute value of the sum of the contrast flags is greater than or equal to a threshold. For example, it is assumed that the threshold is 3. When the sum of the contrast flags is 3 or −3, the graphics processing unit 110 determines that the second fusion weight w'$_{f2}$ has high contrast compared to the fusion weights w'$_f$ of the plurality of neighboring pixels. Then, the graphics processing unit 110 performs step S415; otherwise, the graphics processing unit 110 performs step S420.

In step S415, the graphics processing unit 110 performs the post-filtering process on the second fusion weight w'$_{f2}$ to generate the fusion weight. Specifically, the graphics processing unit 110 executes a convolution operation on a window including the second fusion weight w'$_{f2}$ and the fusion weights w'$_f$ of the neighboring pixels using a predefined convolution kernel.

In an embodiment (the graphics processing unit 110 is set to remove the ghost artifacts from left to right, top to bottom), a predefined convolution kernel may be represented by the following matrix:

$$\begin{bmatrix} w_{p1} & w_{p2} & w_{p3} \\ 0 & w_{P_{ref}} & 0 \\ 0 & 0 & 0 \end{bmatrix}$$

For example, it is assumed that the second fusion weight w'$_{f2}$ of the reference pixel p$_{ref}$ located at the coordinates (x, y) is 1 and the fusion weights of the neighboring pixels p1, p2 and p$_3$ located at (x−1, y−1), (x, y−1), and (x+1, y−1) are 5, 7 and 9, respectively. The weights of these four pixels in the post-filtering process are w$_{P_{ref}}$, w$_{p1}$, w$_{p2}$ and w$_{p3}$, respectively. Thus, the graphics processing unit 110 generates the fusion weight w'$_f$ of the reference pixel p$_{ref}$ using the following formula:

$$\frac{w_{P_{ref}} \times 1 + w_{p1} \times 5 + w_{p2} \times 7 + w_{p3} \times 9}{w_{P_{ref}} + w_{p1} + w_{p2} + w_{p3}}$$

In another embodiment (the graphics processing unit 110 is set to remove the ghost artifacts from top to bottom, left to right), a predefined convolution kernel may be represented by the following matrix:

$$\begin{bmatrix} w_{p1} & 0 & 0 \\ w_{p2} & w_{P_{ref}} & 0 \\ w_{p3} & 0 & 0 \end{bmatrix}$$

For example, assume that the second fusion weight w'$_{f2}$ of the reference pixel p$_{ref}$ located at the coordinates (x, y) is 1 and the fusion weights of the neighboring pixels p1, p2 and p3 located at (x−1, y−1), (x−1, y) and (x−1, y+1) are 5, 7 and 9, respectively. The weights of these four pixels in the post-filtering process are w$_{P_{ref}}$, w$_{p1}$, w$_{p2}$ and w$_{p3}$, respectively. Thus, the graphics processing unit 110 generates the fusion weight w'$_f$ of the reference pixel p$_{ref}$ using the following formula:

$$\frac{w_{P_{ref}} \times 1 + w_{p1} \times 5 + w_{p2} \times 7 + w_{p3} \times 9}{w_{P_{ref}} + w_{p1} + w_{p2} + w_{p3}}$$

It should be noted that, in step S415, since the graphics processing unit 110 merely uses the fusion weights w'$_f$ of the neighboring pixels of the previous column (or the previous row) of the reference pixel p$_{ref}$ located at coordinates (x, y), the graphics processing unit 110 merely needs to store data of two columns (or two rows) in the buffer to perform the post-filtering process. Moreover, during the execution of the post-filtering process by the graphics processing unit 110, each pixel needs to be read only once. That is, the graphics processing unit 110 can achieve a better effect of removing the ghost artifacts with low complexity.

Figure 5:
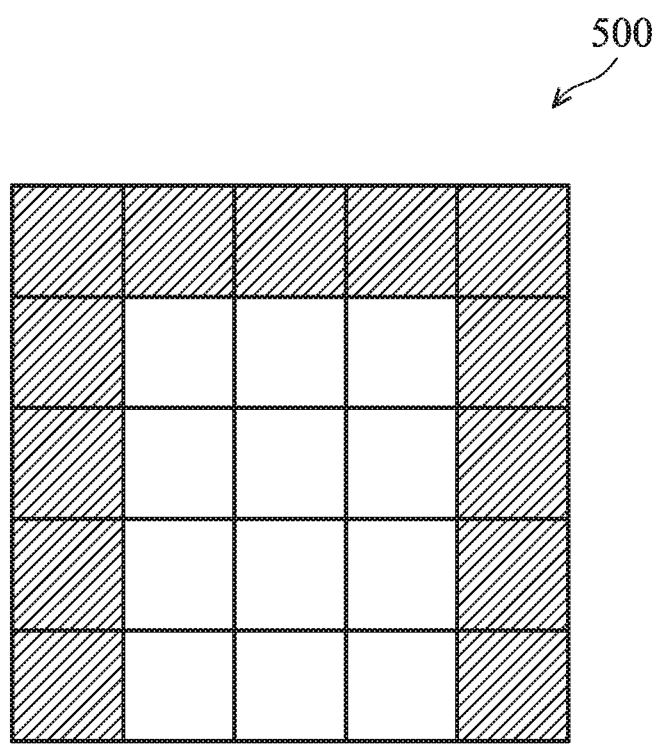
FIG. 5 is a schematic diagram illustrating a frame on which the post-filtering process is performed according to an embodiment of the present disclosure.

In an embodiment (the graphics processing unit 110 is set to remove the ghost artifacts from left to right, top to bottom). For simplicity, when the reference pixel p$_{ref}$ is located in the first column, the first row, or the last row of the reference frame, the graphics processing unit 110 will not perform the post-filtering process on the second fusion weight w'$_{f2}$ of the reference pixel. For example, FIG. 5 is a schematic diagram illustrating a frame 500 on which the post-filtering process is performed according to an embodiment of the present disclosure. As shown in FIG. 5, the pixels with the gray background do not have complete neighboring pixels, so the graphics processing unit 110 does not perform the post-filtering process on the second fusion weights w'$_{f2}$ of the reference pixels.

In another embodiment (the graphics processing unit 110 is set to remove the ghost artifacts from top to bottom, left to right). For simplicity, when the reference pixel $p_{ref}$ is located in the first column, the first row, or the last column of the reference frame, the graphics processing unit 110 does not perform the post-filtering process on the second fusion weight $w'_{f2}$ of the reference pixel.

In step S420, the graphics processing unit 110 may not perform the post-filtering process on the second fusion weight $w'_{f2}$ but directly assigns the value of the second fusion weight $w'_{f2}$ to the fusion weight $w'_{f}$.

Figure 6:
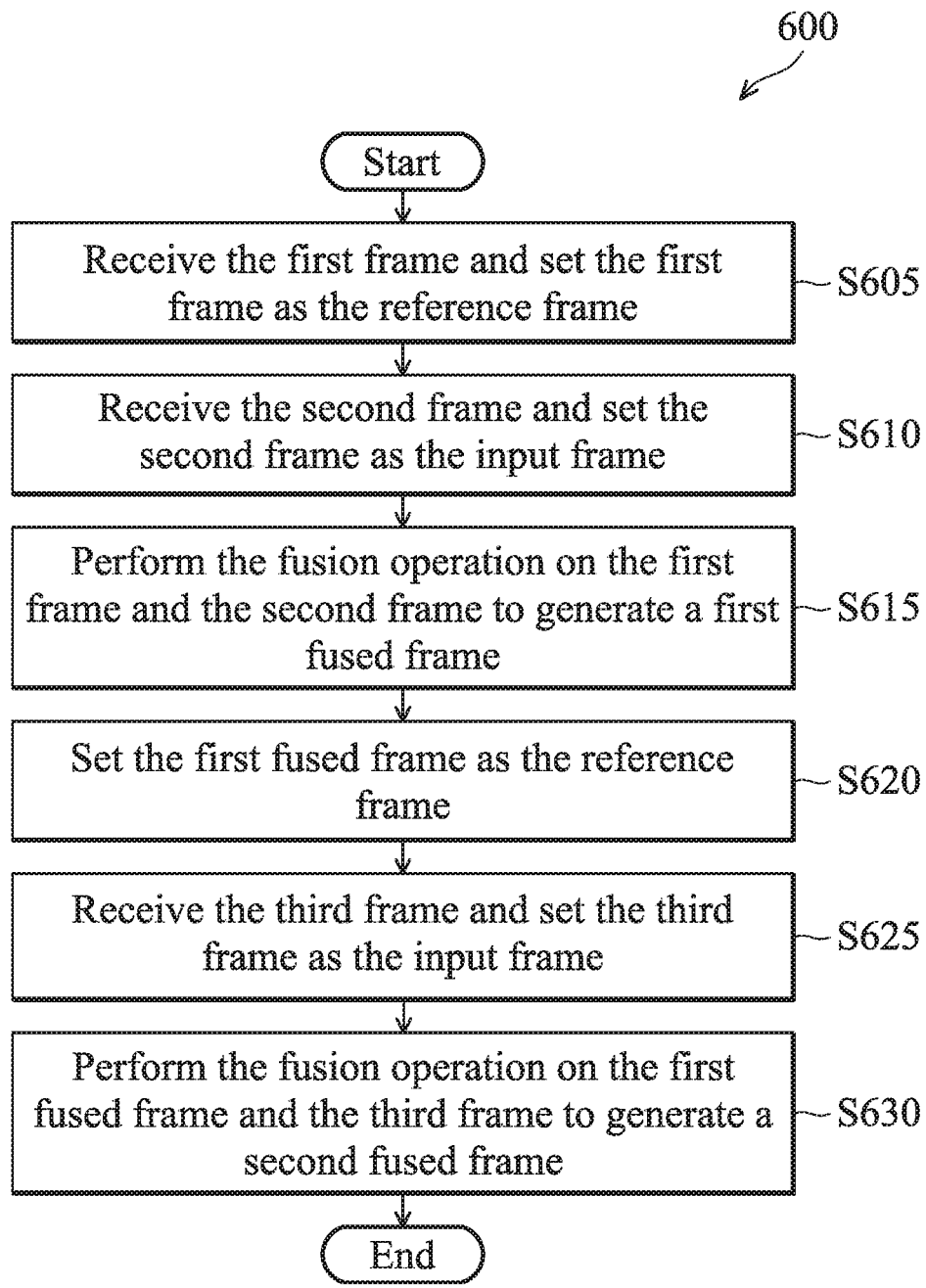
FIG. 6 is a flow chart illustrating a high dynamic range image generation method for removing ghost artifacts according to an embodiment of the present disclosure.

FIG. 6 is a flow chart illustrating a high dynamic range image generation method 600 for removing ghost artifacts according to an embodiment of the present disclosure. The method may be implemented on the graphics processing unit 110 as shown in FIG. 1. In step S605, the graphics processor receives the first frame and sets the first frame as the reference frame. In step S610, the graphics processing unit receives the second frame and sets the second frame as the input frame. Next, in step S615, the graphics processing unit performs the fusion operation on the first frame and the second frame to generate a first fused frame as shown in FIG. 2. Then, in step S620, the graphics processing unit sets the first fused frame as the reference frame. In step S625, the graphics processing unit receives the third frame and sets the third frame as the input frame. In step S630, the graphics processing unit performs the fusion operation on the first fused frame and the third frame to generate a second fused frame as shown in FIG. 2. In this embodiment, the first frame is a normal exposure frame, the second frame is a low exposure frame and the third frame is a high exposure frame, and the second fused frame is a high dynamic range image.

As described above, an image fusion method and an image fusion device for removing ghost artifacts in present disclosure comprising: determining the ghost weight according to the amount that the brightness parameter ratio of the input brightness parameter and the reference brightness parameter deviates from the reasonable range, and correcting the fusion weight of the reference pixel by using the determined ghost weight to achieve the better effect of removing the ghost artifacts when fusing the images. In addition, in one embodiment, the post-filtering process is further utilized to reduce the contrast between the current pixel and the neighboring pixels, and the post-filtering process is performed using only the fusion weights of the neighboring pixels of the previous column (or the previous row), thereby reducing computational complexity and achieving the better effect of removing ghost artifacts.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image fusion method for removing ghost artifacts, wherein the method is used to perform a fusion operation on a reference frame and an input frame to generate a fused frame, the method comprising:
   determining a first fusion weight of a reference pixel in the reference frame, wherein the coordinates of the reference pixel are the same as the coordinates of one of a plurality of input pixels included in the input frame;
   determining a reference brightness parameter according to values of all channels of the reference pixel;
   determining an input brightness parameter according to values of all channels of the input pixel;
   determining a ghost weight according to an amount that the brightness parameter ratio of the input brightness parameter and the reference brightness parameter deviates from a reasonable range;
   determining a fusion weight according to the first fusion weight and the ghost weight; and
   fusing the reference pixel with the input pixel according to the fusion weight to generate a fused pixel located at corresponding coordinates in the fused frame.

2. The image fusion method for removing ghost artifacts as claimed in claim 1, wherein the greater the amount that the brightness parameter ratio deviates from the reasonable range is, the greater is the ghost weight.

3. The image fusion method for removing ghost artifacts as claimed in claim 1, wherein the ghost weight is calculated using the following formula:

$$w_g = \begin{cases} \dfrac{\left| \dfrac{Y_{p_{in}}}{Y_{p_{ref}}} - \dfrac{EV_{in}}{EV_{ref}} \right|}{r_{tol} \cdot \dfrac{EV_{in}}{EV_{ref}}}, & \dfrac{Y_{p_{in}}}{Y_{p_{ref}}} \in \left[ (1-r_{tol}) \cdot \dfrac{EV_{in}}{EV_{ref}}, (1+r_{tol}) \cdot \dfrac{EV_{in}}{EV_{ref}} \right] \\ 1, & \text{other} \end{cases}$$

wherein $w_g$ is the ghost weight, $Y_{p_{in}}$ is the input brightness parameter, $Y_{p_{ref}}$ is the reference brightness parameter, $EV_{in}$ is an input exposure parameter of the input frame, $EV_{ref}$ is a reference exposure parameter of the reference frame, and $r_{tol}$ is a tolerance factor that is greater than 0.

4. The image fusion method for removing ghost artifacts as claimed in claim 1, wherein the ghost weight is calculated using the following formula:

$$w_g = \begin{cases} \dfrac{1 + \cos\left( 2\pi \cdot \dfrac{\dfrac{Y_{p_{in}}}{Y_{p_{ref}}} - (1-r_{tol}) \cdot \dfrac{EV_{in}}{EV_{ref}}}{2r_{tol} \cdot \dfrac{EV_{in}}{EV_{ref}}} \right)}{2}, & \dfrac{Y_{p_{in}}}{Y_{p_{ref}}} \in \left[ \dfrac{(1-r_{tol}) \cdot EV_{in}}{EV_{ref}}, \dfrac{(1+r_{tol}) \cdot EV_{in}}{EV_{ref}} \right] \\ 1, & \text{other} \end{cases}$$

wherein $w_g$ is the ghost weight, $Y_{p_{in}}$ is the input brightness parameter, $Y_{p_{ref}}$ is the reference brightness parameter, $EV_{in}$, is an input exposure parameter of the input frame, $EV_{ref}$ is a reference exposure parameter of the reference frame, and $R_{tol}$ is a tolerance factor that is greater than 0.

5. The image fusion method for removing ghost artifacts as claimed in claim 1, wherein the greater the ghost weight is, the greater is the fusion weight, wherein the smaller the ghost weight is, the closer the fusion weight is to the first fusion weight.

6. The image fusion method for removing ghost artifacts as claimed in claim 1, wherein the fusion weight is calculated using the following formula:

$$w'_f = w_g \cdot (1-w_f) + w_f$$

wherein $w_g$ is the ghost weight, $w_f$ is the first fusion weight, and $w'_f$ is the fusion weight.

7. The image fusion method for removing ghost artifacts as claimed in claim 1, wherein the step of determining a fusion weight according to the first fusion weight and the ghost weight comprises:
   determining a second fusion weight according to the first fusion weight and the ghost weight;
   determining whether the second fusion weight has high contrast compared to fusion weights of a plurality of neighboring pixels of the reference pixel;
   performing a post-filtering process on the second fusion weight to generate the fusion weight when the second fusion weight has the high contrast compared to the fusion weights of the plurality of neighboring pixels; and
   directly assigning the value of the second fusion weight to the fusion weight when the second fusion weight does not have the high contrast compared to the fusion weights of the plurality of neighboring pixels.

8. The image fusion method for removing ghost artifacts as claimed in claim 7, wherein the step of determining whether the second fusion weight has high contrast compared to fusion weights of a plurality of neighboring pixels of the reference pixel comprises:
   determining a plurality of contrast flags according to the second fusion weight and the fusion weights of the plurality of neighboring pixels; and
   determining whether the second fusion weight has the high contrast compared to fusion weights of the neighboring pixels of the reference pixel according to the plurality of contrast flags.

9. The image fusion method for removing ghost artifacts as claimed in claim 8, wherein each of the plurality of contrast flags is calculated using the following formula:

$$f_c = \begin{cases} 1, & w'_{f2} < \frac{1}{k_c} \cdot w'_f \\ -1, & w'_{f2} > k_c \cdot w'_f \\ 0, & \text{other} \end{cases}$$

wherein $f_c$ is the contrast flag, $w'_{f2}$ is the second fusion weight, $w'_f$ is one of the fusion weights of the neighboring pixels, and $k_c$ is the contrast factor, wherein $k_c$ is greater than 1.

10. The image fusion method for removing ghost artifacts as claimed in claim 8, wherein when the absolute value of the sum of the plurality of contrast flags is greater than or equal to a threshold, it is determined that the second fusion weight has the high contrast compared to the fusion weights of the plurality of neighboring pixels.

11. The image fusion method for removing ghost artifacts as claimed in claim 7, wherein the post-filtering process comprises:
   executing a convolution operation on a window including the second fusion weight and the fusion weights of the plurality of neighboring pixels using a predefined convolution kernel.

12. The image fusion method for removing ghost artifacts as claimed in claim 1, wherein the reference brightness parameter is calculated using the following formula:

$$Y_{P_{ref}} = \sum_{C_{P_{ref}} \in S_{P_{ref}}} C_{P_{ref}} / |S_{P_{ref}}|$$

wherein $Y_{P_{ref}}$ is the reference brightness parameter, $C_{P_{ref}}$ is a set of values of all channels of the reference pixel, and $|S_{P_{ref}}|$ is the number of channels in which the values of all channels of the reference pixel are within a range; wherein the input brightness parameter is calculated using the following formula:

$$Y_{P_{in}} = \sum_{C_{P_{in}} \in S_{P_{in}}} C_{P_{in}} / |S_{P_{in}}|$$

wherein $Y_{P_{in}}$ is the input brightness parameter, $C_{P_{in}}$ is a set of values of all channels of the input pixel, $|S_{P_{in}}|$ is the number of channels in which the values of all channels of the input pixel are within a range.

13. The image fusion method for removing ghost artifacts as claimed in claim 12, wherein when $|S_{P_{ref}}|$ is 0, the final value of the fusion weight is set to the first fusion weight, and when $|S_{P_{ref}}|$ is not 0 and $|S_{P_{in}}|$ is 0, the final value of the fusion weight is set to 1.

14. The image fusion method for removing ghost artifacts as claimed in claim 1, wherein the fused pixel is generated using the following formula:

$$C_p = w'_f \cdot C_{P_{ref}} + (1-w'_f) \cdot C_{P_{in}}$$

wherein $C_p$ is a set of values of all channels of the fused pixel, $C_{P_{ref}}$ is a set of values of all channels of the reference pixel, $C_{P_{in}}$ is a set of values of all channels of the input pixel, and $w'_f$ is the fusion weight.

15. The image fusion method for removing ghost artifacts as claimed in claim 1, wherein the step of determining a first fusion weight of a reference pixel in the reference frame comprises:
   determining a reference pixel weight according to a brightness value of the reference pixel;
   determining an input pixel weight according to a brightness value of the input pixel; and
   determining the first fusion weight according to the reference pixel weight and the input pixel weight.

16. The image fusion method for removing ghost artifacts as claimed in claim 15, wherein the first fusion weight is calculated using the following formula:

$$w_f = w_{ref} / (w_{ref} + w_{in})$$

wherein $w_f$ is the first fusion weight, $w_{ref}$ is the reference pixel weight, and $w_{in}$ is the input pixel weight.

17. The image fusion method for removing ghost artifacts as claimed in claim 1, wherein the method further comprises:

receiving the first frame and setting the first frame as the reference frame;

receiving a second frame and setting the second frame as the input frame;

performing the fusion operation on the first frame and the second frame to generate a first fused frame;

setting the first fused frame as the reference frame;

receiving a third frame and setting the third frame as the input frame; and performing the fusion operation on the first fused frame and the third frame to generate a second fused frame.

18. The image fusion method for removing ghost artifacts as claimed in claim 17, wherein the first frame is a normal exposure frame, the second frame is a low exposure frame, the third frame is a high exposure frame, and the second fused frame is a high dynamic range image.

19. An image fusion device for removing ghost artifacts, wherein the device is used to perform a fusion operation on a reference frame and an input frame to generate a fused frame, and the device comprises:

a frame buffer, temporarily storing the reference frame;

a graphics processing unit, coupled to the frame buffer, wherein the graphics processing unit determines a first fusion weight of a reference pixel in the reference frame, wherein the coordinates of the reference pixel are the same as the coordinates of one of a plurality of input pixels included in the input frame; determines a reference brightness parameter according to values of all channels of the reference pixel; determines an input brightness parameter according to values of all channels of the input pixel; determines a ghost weight according to an amount that the brightness parameter ratio of the input brightness parameter and the reference brightness parameter deviates from a reasonable range; determines a fusion weight according to the first fusion weight and the ghost weight; and fuses the reference pixel with the input pixel according to the fusion weight to generate a fused pixel located at corresponding coordinates in the fused frame.

20. The image fusion device for removing ghost artifacts as claimed in claim 19, wherein the greater the ghost weight is, the greater is the fusion weight, wherein the smaller the ghost weight is, the closer the fusion weight is to the first fusion weight.

* * * * *